(12) United States Patent
Gaitonde et al.

(10) Patent No.: US 12,370,765 B2
(45) Date of Patent: Jul. 29, 2025

(54) BISCUIT JOINT REPAIR OF CONTINUOUS UD STRUCTURAL ELEMENTS

(71) Applicant: AIRBUS OPERATIONS LIMITED, Bristol (GB)

(72) Inventors: John Martin Gaitonde, Bristol (GB); Chris Heaysman, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 109 days.

(21) Appl. No.: 18/299,385

(22) Filed: Apr. 12, 2023

(65) Prior Publication Data
US 2023/0330954 A1     Oct. 19, 2023

(30) Foreign Application Priority Data
Apr. 14, 2022    (GB) .................................. 2205601

(51) Int. Cl.
*B29C 73/04*      (2006.01)
*B29C 65/00*      (2006.01)
(Continued)

(52) U.S. Cl.
CPC ........ *B29C 73/26* (2013.01); *B29C 66/02241* (2013.01); *B29C 66/12221* (2013.01); *B29C 66/139* (2013.01); *B29C 73/04* (2013.01); *B64F 5/40* (2017.01); *B29C 2073/264* (2013.01); *B29L 2031/3082* (2013.01)

(58) Field of Classification Search
CPC .......... B29C 66/0224; B29C 66/02241; B29C 66/1222; B29C 66/12221; B29C 66/124; B29C 66/1248; B29C 66/13; B29C 66/139; B29C 73/04; B29C 73/06; B29C 73/10; B29C 73/26; B29C 2073/264;
(Continued)

(56) References Cited

U.S. PATENT DOCUMENTS 4,916,880 A    4/1990   Westerman, Jr.
5,476,340 A   12/1995   Contrasto
(Continued)

FOREIGN PATENT DOCUMENTS

EP     0 258 596 A2    3/1988
EP     3 712 423        9/2020
(Continued)

OTHER PUBLICATIONS

European Search Report cited in EP 23163808.1 mailed Oct. 5, 2023, 10 pages.
(Continued)

*Primary Examiner* — Michael A Tolin
(74) *Attorney, Agent, or Firm* — Nixon & Vanderhye P.C.

(57) ABSTRACT

A method of repairing a composite beam having a longitudinal direction including: removing material from a damaged area of the composite beam to form a cut out region; machining a plurality of elongate slots into the composite beam, the elongate slots each having a length in the longitudinal direction of the composite beam and spanning across the damaged area, the elongate slots extending into the composite beam to a depth greater than a depth of the cut out region; introducing a plurality of reinforcing inserts into the respective elongate slots and fixing the reinforcing inserts into the slots with adhesive.

18 Claims, 10 Drawing Sheets

(51) Int. Cl.
  *B29C 73/26* (2006.01)
  *B64F 5/40* (2017.01)
  *B29L 31/30* (2006.01)

(58) Field of Classification Search
  CPC ..... B29L 2031/3076; B29L 2031/3082; B29L 2031/3085; B64C 1/064; B64F 5/40
  See application file for complete search history.

(56) References Cited

U.S. PATENT DOCUMENTS

| | | | | |
|---|---|---|---|---|
| 5,804,511 | A * | 9/1998 | Kelman | ............... B60R 19/03 442/245 |
| 11,607,853 | B2 | 3/2023 | Charlas et al. | |
| 2014/0141190 | A1 | 5/2014 | Shigetomi et al. | |
| 2016/0137316 | A1 | 5/2016 | Shigetomi et al. | |
| 2019/0210308 | A1 | 7/2019 | Marouzé | |
| 2022/0266552 | A1 * | 8/2022 | Holzhüter | ............... B29C 73/04 |

FOREIGN PATENT DOCUMENTS

| | | | |
|---|---|---|---|
| JP | 2017-35848 | 2/2017 | |
| KR | 10-1195610 | 10/2012 | |
| KR | 1195610 B1 * | 10/2012 | |
| WO | 2009/157941 | 12/2009 | |
| WO | WO-2016150445 A1 * | 9/2016 | ........... B29C 73/025 |
| WO | 2020/169920 A1 | 8/2020 | |
| WO | 2021/023829 | 2/2021 | |
| WO | WO-2021023829 A1 * | 2/2021 | |
| WO | 2021/260447 | 12/2021 | |

OTHER PUBLICATIONS

Combined Search and Examination Report for GB2205601.4, dated Oct. 12, 2022, 7 pages.

* cited by examiner

BISCUIT JOINT REPAIR OF CONTINUOUS UD STRUCTURAL ELEMENTS

RELATED APPLICATION

This application incorporates by reference and claims priority to United Kingdom patent application GB 2205601.4, filed Apr. 14, 2022.

FIELD OF THE INVENTION

The present invention relates to a method of repairing a composite beam, a repaired composite beam, a composite beam, a structural assembly, and an aircraft.

BACKGROUND OF THE INVENTION

Composite beams are used in many applications, such as in structural components of aircraft and other high-performance applications. In some instances, it may be necessary to repair a composite beam.

Scarf repairs are a common method of repairing composite beams in which a damaged area is removed, the composite beam is further prepared by creating a shallow recess around the damaged area, and a scarf patch is inserted into the recess of the composite beam. However, to efficiently transfer loads across scarf repair, a large section of the composite beam needs to be removed in order to create a sufficiently shallow recess.

SUMMARY OF THE INVENTION

A first aspect of the invention provides a method of repairing a composite beam having a longitudinal direction, the method comprising: removing material from a damaged area of the composite beam to form a cut out region; machining a plurality of elongate slots into the composite beam, the elongate slots each having a length in the longitudinal direction of the composite beam and spanning across the damaged area, the elongate slots extending into the composite beam to a depth greater than a depth of the cut out region; introducing a plurality of reinforcing inserts into the respective elongate slots and fixing the reinforcing inserts into the slots with adhesive.

With this arrangement, a large bonding area is provided between the elongate slots and the reinforcing inserts. This is provided by, at least, the ability to use a plurality of reinforcing inserts that each form a double lap joint (i.e., both sides form an interfacial bond with the existing composite beam structure).

This large surface area is provided without the need to provide a shallow angle, as is the case for scarf joints or similar. Such a shallow angle requires a significantly larger repair area to be provided than the present invention, and can also be more difficult to manufacture. The length of the repair in the longitudinal direction of the beam is therefore reduced with the claimed method.

The repair method can be achieved with simple tools, and therefore may be performed inside a more confined space than other methods (e.g., inside a wing box, and thereby provide reduced down time of the aircraft).

The method may comprise machining three or more elongate slots and introducing three or more reinforcing inserts. Preferably the method comprises machining five or more elongate slots and introducing five or more reinforcing inserts.

The elongate slots may be substantially equally spaced from one another in a transverse direction perpendicular to the longitudinal direction.

Each elongate slot may extend substantially equidistantly either side of the cut out region in the longitudinal direction.

The reinforcing inserts may have a thickness and each reinforcing insert may be spaced from an adjacent reinforcing insert by a slot spacing, wherein a ratio of the slot spacing to the thickness is at least 1:1, and preferably at least 2:1.

A ratio of a length of each reinforcing insert in the longitudinal direction to a length of the cut out region in the longitudinal direction may be at least 5:1, and preferably at least 10:1.

Each elongate slot may be uniform along its length.

The elongate slots may extend perpendicular into the surface of the composite beam.

The composite beam may comprise a fibre reinforced composite element through which the elongate slots extend, optionally wherein more than 25% of the composite fibres of the fibre reinforced composite element are oriented substantially in the longitudinal direction of the beam, optionally more than 50% are oriented substantially in the longitudinal direction of the beam, and optionally substantially all of the composite fibres of the fibre reinforced composite element are oriented substantially in the longitudinal direction of the beam.

The composite beam may comprise a foam core material beneath the fibre reinforced composite element, optionally wherein the elongate slots extend through the fibre reinforced composite element into the foam core material.

The reinforcing inserts may each be formed of a fibre reinforced composite material.

The method may comprise inserting one or more filler pieces into the cut out region, preferably wherein the filler pieces comprise one or more of foam and chopped composite fibres.

The method may further comprise, subsequent to introducing the plurality of reinforcing inserts into the respective elongate slots and inserting the one or more filler pieces into the cut out region to complete the profile of the composite beam, laying one or more overlapping plies onto the composite beam so as to extend over and cover the one or more filler pieces and the reinforcing inserts.

The one or more overlapping plies may comprise composite fibres oriented at substantially 45 degrees to the longitudinal direction of the beam, optionally wherein more than 50% of the composite fibres of the overlapping plies are oriented at substantially 45 degrees to the longitudinal direction of the beam.

The method may comprise, after laying the one or more overlapping plies onto the composite beam, curing the overlapping plies.

A second aspect of the invention provides a repaired composite beam formed by the method of the first aspect.

A third aspect of the invention provides a composite beam having a longitudinal direction and a repair region, wherein the repair region includes a cut out region corresponding to a previously removed damage area, a plurality of elongate slots extending into the composite beam, the elongate slots each having a length in the longitudinal direction of the composite beam and spanning across the cut out region, the slots extending into the beam to a depth greater than a depth of the cut out region, and a plurality of reinforcing inserts adhesively bonded in the respective elongate slots.

The composite beam may comprise three or more elongate slots and three or more reinforcing inserts, and preferably comprising five or more elongate slots and five or more reinforcing inserts.

Each elongate slot may extend substantially equidistantly either side of the cut out region in the longitudinal direction.

The reinforcing inserts may have a thickness and each reinforcing insert may be spaced from an adjacent reinforcing insert by a slot spacing, wherein a ratio of the slot spacing to the thickness is at least 1:1, and preferably at least 2:1.

A ratio of a length of each reinforcing insert in the longitudinal direction to a length of the cut out region in the longitudinal direction may be at least 5:1, and preferably at least 10:1.

The composite beam may comprise composite fibres, and more than 25% of the composite fibres are oriented substantially in the longitudinal direction of the beam, and optionally more than 50% of the composite fibres are oriented substantially in the longitudinal direction of the beam.

The composite beam may further comprise one or more overlapping plies on the composite beam that extend over and cover the cut out region and the plurality of elongate slots.

A fourth aspect of the invention provides a structural assembly, comprising the composite beam of the third aspect attached to a panel. The panel is preferably formed of composite material.

A surface of the composite beam through which the elongate slots extend may be a first surface, and the composite beam may attach to the panel on a second surface opposing the first surface.

A fifth aspect provides an aircraft comprising the composite beam of the third aspect or the structural assembly of the fourth aspect.

The aircraft may comprise a wing, wherein the composite beam is a stiffener extending longitudinally along the wing.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
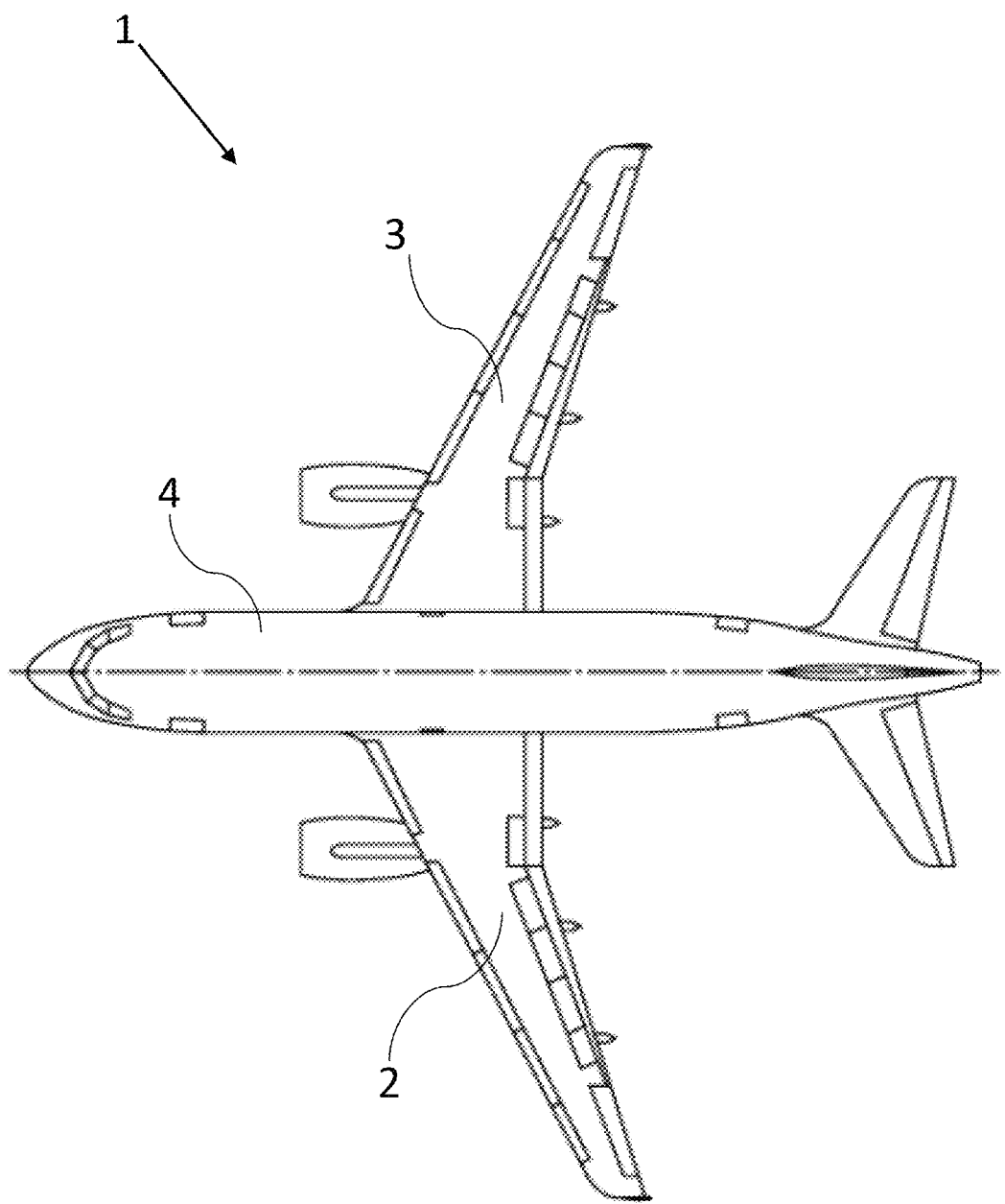
FIG. 1 shows an aircraft.

FIG. 1 shows an aircraft 1 with port and starboard wings 2, 3. Each wing has a cantilevered structure with a length extending in a generally spanwise direction 42 from a root to a tip (indicated on FIG. 3), the root being joined to an aircraft fuselage 4. The wings 2, 3 are similar in construction so only the starboard wing 3 will be described in detail with reference to FIGS. 2 and 3.

The main structural element of the wing 3 is a wing box 20 formed by upper and lower covers 21, 22 and front and rear spars 6, 7 shown in cross-section in FIG. 1. The covers 21, 22 and spars 6, 7 may each be formed of Carbon Fibre Reinforced Polymer (CFRP) laminate components. Each cover 21, 22 comprises a panel assembly and may have a curved aerodynamic outer surface (e.g., the upper surface of the upper cover 21 and the lower surface of the lower cover 22) over which air flows during flight of the aircraft 1. Each cover 21, 22 has an inner surface carrying a series of stiffeners 8 extending in the spanwise direction 42 (only some of the stiffeners 8 are labelled so as to improve the clarity of the figures). Each stiffener 8 is joined to one cover 21, 22 but not the other.

Figure 2:
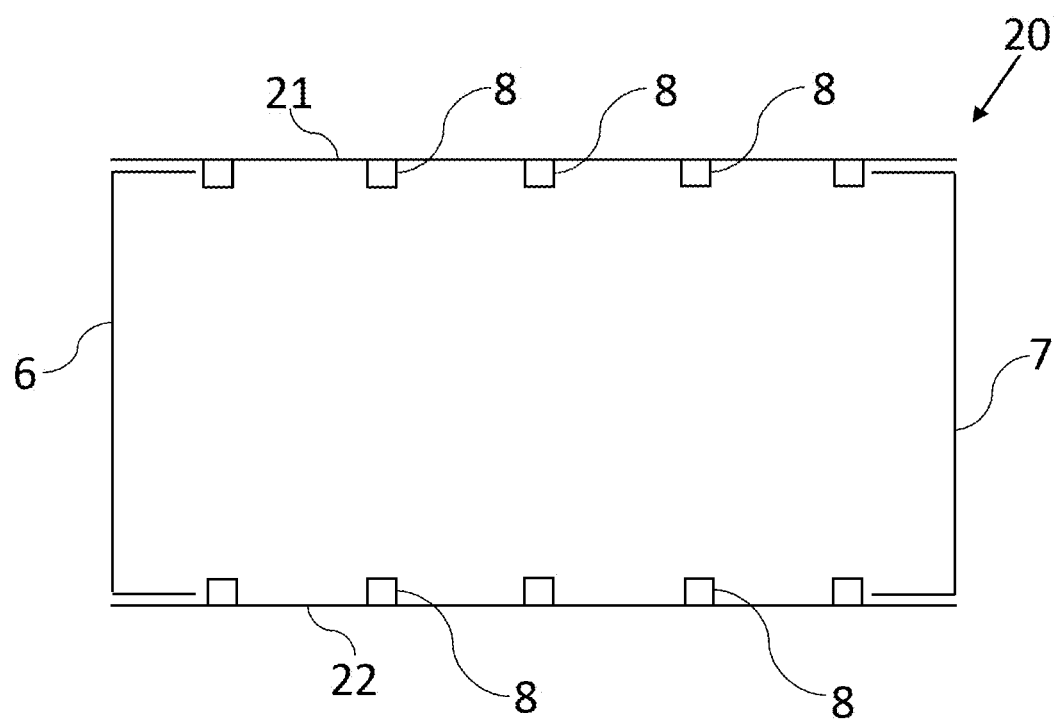
FIG. 2 is a sectional view of a wing box of the starboard wing.
Figure 3:
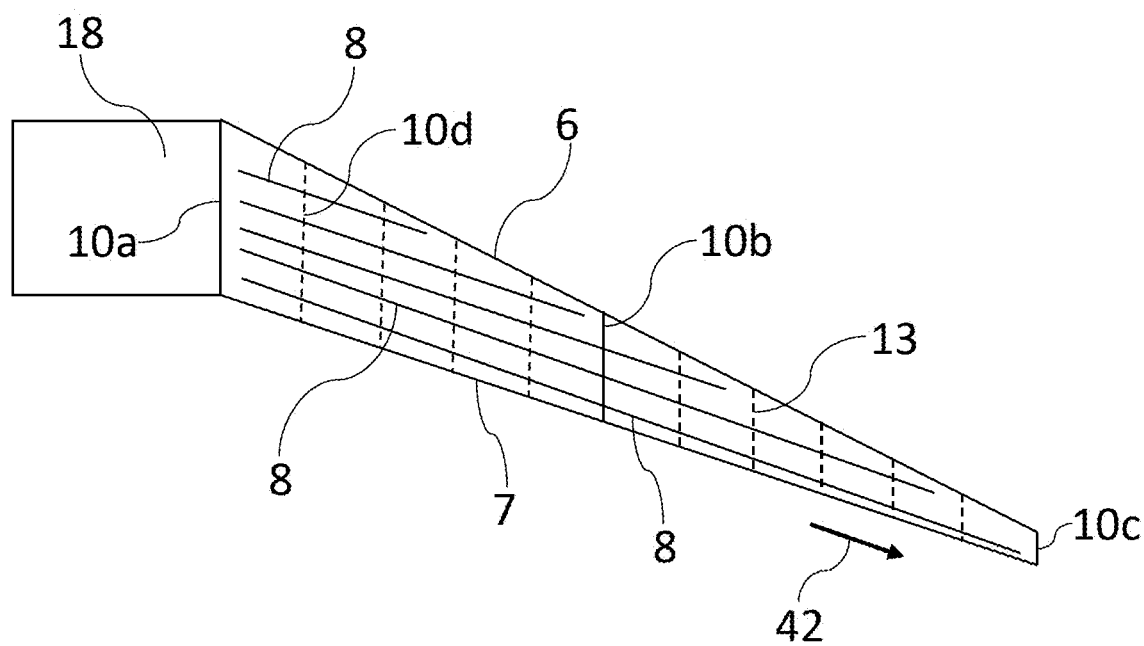
FIG. 3 shows a starboard wing of the aircraft.

It will be understood that any number of stiffeners 8 may be applied across the chord of the wing 3, although only five are shown coupled to each cover 21, 22 in FIGS. 2 and 3 for purposes of clarity.

The wing box 20 may have a plurality of transverse ribs, each rib being joined to the covers 21, 22 and the spars 6, 7. The ribs 10a, 10b, 10c, 10d may include an inner-most inboard rib 10a located at the root of the wing box 20, and a number of further ribs 10b, 10c, 10d spaced apart from the inner-most rib 10a along the length of the wing box 20. The wing box 20 may be divided into two or more fuel tanks. In the example of FIG. 2, the wing box 20 is divided into two fuel tanks: an inboard wing fuel tank bounded by the inboard rib 10a, a mid-span rib 10b, the covers 21, 22 and the spars 6, 7; and an outboard wing fuel tank bounded by the mid-span rib 10b, an outboard rib 10c at the tip of the wing box 20, the covers 21, 22 and the spars 6, 7.

The inboard rib 10a may be an attachment rib which forms the root of the wing box 20 and is joined to a centre wing box 18 within the body of the fuselage 4. The wing box 20 may include baffle ribs 10d (shown in dashed lines in FIG. 3) that form internal baffles within the fuel tanks which divide the fuel tanks into rib bays. The inboard rib 10a, mid-span rib 10b, and outboard rib 10c may be sealed to prevent the flow of fuel out of the two fuel tanks, however the baffle ribs 10d are not sealed so that fuel can flow across them between the rib bays. As can be seen in FIG. 3, the stiffeners may stop short of the inboard rib 10a and the outboard rib 10c, but pass through the baffle ribs 10d and the mid-span rib 10b.

Each rib 10a, 10b, 10c, 10d may connect the upper cover 21 to the lower cover 22. The stiffeners 8 may pass through rib recesses (not shown) in the rib 13. [11.]

The stiffeners 8 may become damaged, for example during manufacture, assembly or in service, and therefore require repair.

A method of repairing a composite beam 30 attached to a panel 25, such as a stiffener 8 attached to a cover 21, 22, will now be described with reference to FIGS. 4 to 17.

Figure 4:
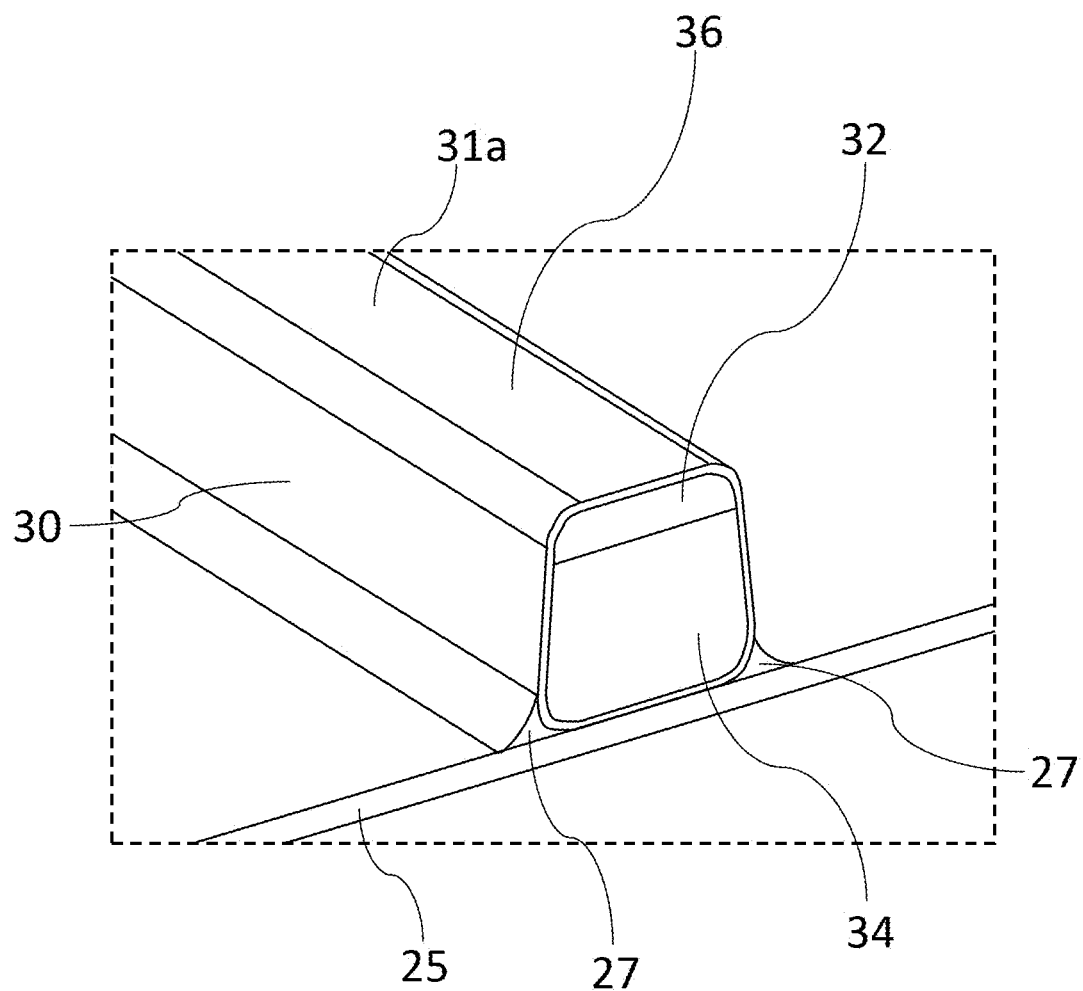
FIG. 4 shows a stiffener of the aircraft.

FIG. 4 shows an example of a structural assembly comprising a composite beam 30 attached to a panel 25. The composite beam 30 may have a longitudinal direction and a traverse direction, with the composite beam 30 being longer in the longitudinal direction. The composite beam 30 and panel 25 may be a stiffener 8 attached to a cover 21, 22, such as shown in FIGS. 2 and 3, although it will be appreciated that the repair method relates to any suitable composite beam 30 requiring repair.

The composite beam 30 may have first and second surfaces 31a, 31b (the second surface is labelled in FIG. 9), with the first surface 31a facing away from the panel 25 and the second surface 31b attached to the panel 25, such that the first surface 31a opposes the second surface 31b.

The composite beam 30 may comprise a structural element 32. The structural element 32 may include a high proportion of composite fibres that are oriented substantially in the longitudinal direction of the composite beam 30. For example, more than 25% of the composite fibres may be oriented substantially in the longitudinal direction of the composite beam 30, or more than 50% of the composite fibres may be oriented substantially in the longitudinal direction of the beam.

In the example shown in FIG. 4, substantially all of the composite fibres in the structural element 32 are oriented in the longitudinal direction of the composite beam 30 (i.e., at 0 degrees to the longitudinal direction). It will be understood that reference to 'substantially' in the context of fibre orientation throughout the specification is intended to accommodate for some misalignment of the fibres (e.g. the fibres being oriented within 5 degrees of the longitudinal direction) and/or a small number of fibres being misaligned (e.g. 1-2% of the fibres not being oriented at 0 degrees).

The composite beam 30 may comprise a core 34. In the example of FIG. 4, the core 34 is beneath the structural element 32, such that the structural element 32 is between the core 34 and the first (upper) surface 31a of the composite beam 30.

The core 34 may comprise any suitable material, although in the present example the core 34 comprises a foam material.

A shell 36 may surround the core 34 and/or the structural element 32, for example as shown in FIG. 4. The shell 36 may comprise composite materials, such as fibre reinforced composite material. The fibres of the composite material may include a high proportion of fibres oriented at ±45 degrees to the longitudinal direction of the composite beam 30. For example, more than 50% of the fibres of the shell 36 may be oriented at substantially ±45 degrees to the longitudinal direction of the beam. In the example shown in FIG. 4, substantially all the fibres of the shell 36 are oriented at substantially ±45 degrees to the longitudinal direction. A high proportion of fibres oriented at ±45 degrees provides increased shear strength to the composite beam 30. The shell 36 may be formed of a woven composite material.

The composite beam 30 may be attached to a panel 25 by an adhesive such as epoxy adhesive 27, as shown in FIG. 4. The panel 25 may be formed of composite material. The composite material of the panel 25 may be the same or different to the composite materials of the composite beam 30.

It will be appreciated that the composite beam 30 may be damaged, for example during use or manufacture, and necessitate repair so that the composite beam 30 can be returned to service.

Figure 5:
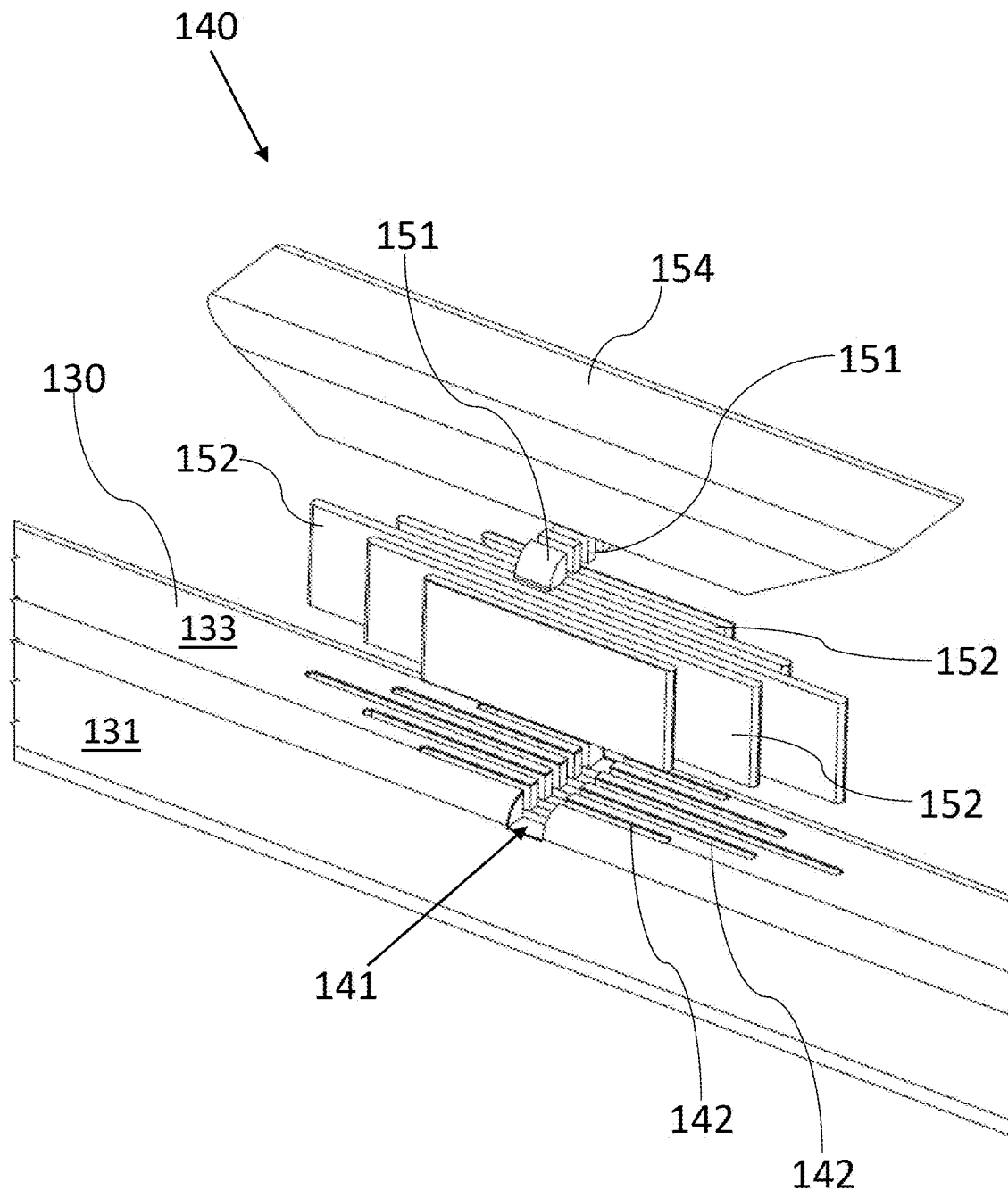
FIG. 5 shows an exploded view of a repaired composite beam.

FIG. 5 shows an exploded view of a repaired composite beam 130. The repaired composite beam 130 includes a repair region 140. The repair region 140 includes a cut out region 141 corresponding to a previously removed damaged area, and a plurality of elongate slots 142 extending into the composite beam 130 (only some of which are labelled to improve the clarity of the figures). The composite beam 130 has a first side 131, a second side 132 (FIG. 8) and an edge 133 between the first and second sides.

The elongate slots 142 each have a length in the longitudinal direction of the composite beam 130 that spans across the cut out region 141 (such that the elongate slots 142 extend either side of the cut out region 141), with the slots 142 extending into the composite beam 130 to a depth greater than a depth of the cut out region 141.

A corresponding plurality of reinforcing inserts 152 are provided, with each reinforcing insert 152 arranged to be adhesively bonded into a respective elongate slot 142. The reinforcing inserts 152 are arranged to substantially fill the respective elongate slots 142, ensuring that the reinforcing inserts 152 utilise all the available elongate slots 142 for load transfer.

The reinforcing inserts 152 may be formed of any suitable material, although in FIG. 5 the reinforcing inserts 152 are each formed of a fibre reinforced composite material. The elastic modulus of the reinforcing inserts 152 may be greater than the elastic modulus of the structural element 32.

It will be appreciated that the composite beam 130 may comprise any suitable number of elongate slots 142 and corresponding reinforcing inserts 152. FIG. 5 shows an example comprising five reinforcing inserts 152 insertable into five elongate slots 142, however it will be appreciated there may any suitable number of elongate slots 142 and reinforcing inserts 152 may be provided.

Filler pieces 151 may be provided that are inserted into the cut out region 141 between the reinforcing inserts 152. The filler pieces 151 shown in FIG. 5 are formed of foam, although it will be appreciated that the filler pieces 151 may be formed of any suitable material including chopped composite fibres or a sealant.

The composite beam 130 may include one or more overlapping plies 154, for example as shown in FIG. 5. The overlapping plies 154 extend over and cover the cut out region 141 and the plurality of elongate slots 142, such that the cut out region 141 and the plurality of elongate slots 142 are entirely beneath the overlapping plies 154.

The overlapping plies 154 may comprise composite fibres oriented at substantially ±45 degrees to the longitudinal direction of the beam 130. A high proportion of the fibres may be oriented at ±45 degrees to the longitudinal direction of the composite beam 30. For example, more than 50% of the fibres of the overlapping plies 154 may be oriented at substantially ±45 degrees to the longitudinal direction of the beam. In the example shown in FIG. 5, substantially all the fibres of the overlapping plies 154 are oriented at substantially ±45 degrees to the longitudinal direction, however it will be appreciated that any suitable composite fibre layup may be provided, with the fibres layers each oriented in any direction. The configuration of the composite plies in the overlapping plies 154 may substantially mirror that of the shell 36.

The method of repairing the composite beam 30 will now be described with reference to FIGS. 6 to 15.

A damaged area of the composite beam 30 may be identified by any suitable method, including visual inspection, tap tasting, ultrasound, or any other method known in the art. The damaged area of the composite beam 30 is subsequently removed to form a cut out region 141. The cut out region 141 will typically be slightly larger than the damaged region so as to form a smooth outer surface.

Figure 6:
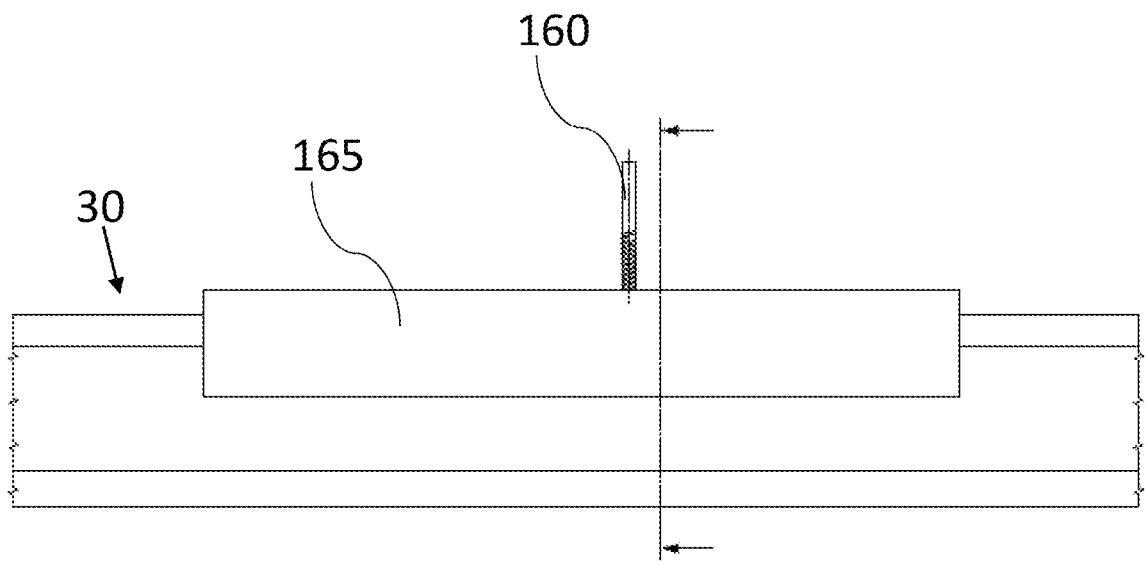
FIGS. 6 and 7 show a guide for guiding a machining tool to form a cut out region.
Figure 7:
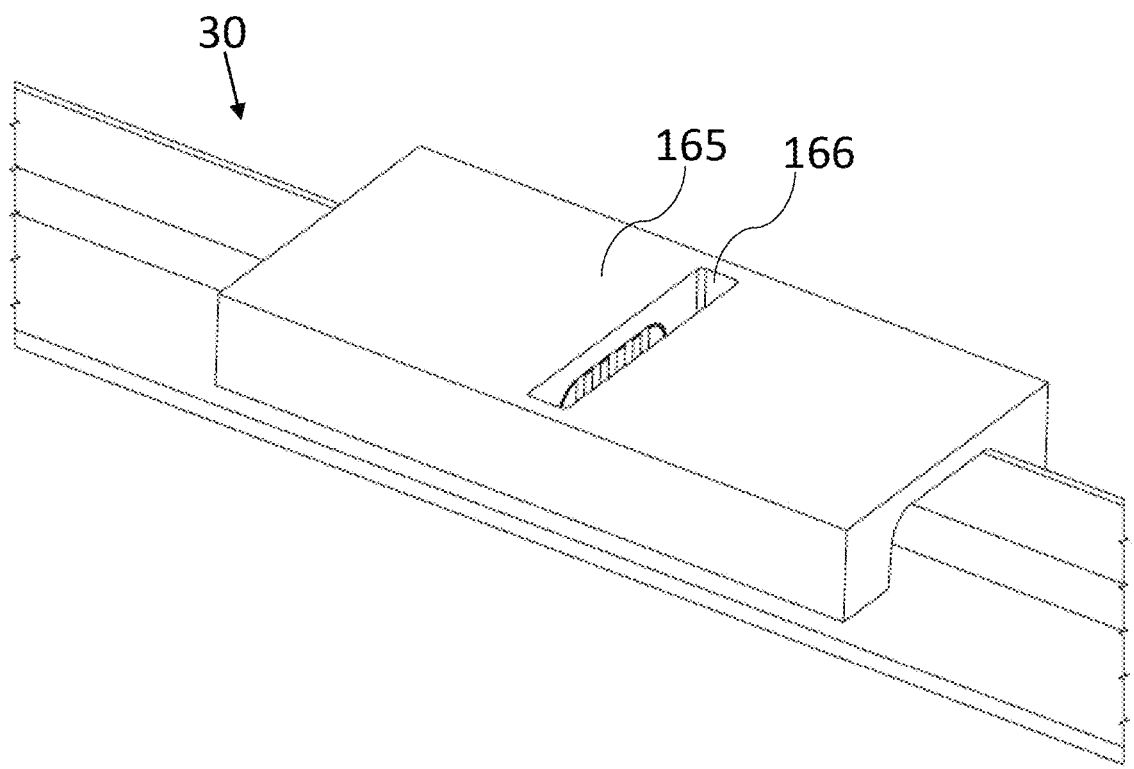

The cut out region 141 may be machined by a machining tool, for example by a router bit 160 or other suitable means, for example as shown in FIG. 6. To assist in controlling the dimensions of the cut out region 141, a first guide 165 may be provided to guide the machining tool and ensure the cut out region 141 is accurately dimensioned without removing more material of the composite beam 30 than desired. For example, the first guide 165 may extend over at least a portion of the composite beam 30 and provide a slot 166 to guide the machining tool, for example as shown in FIG. 7.

Figure 9:
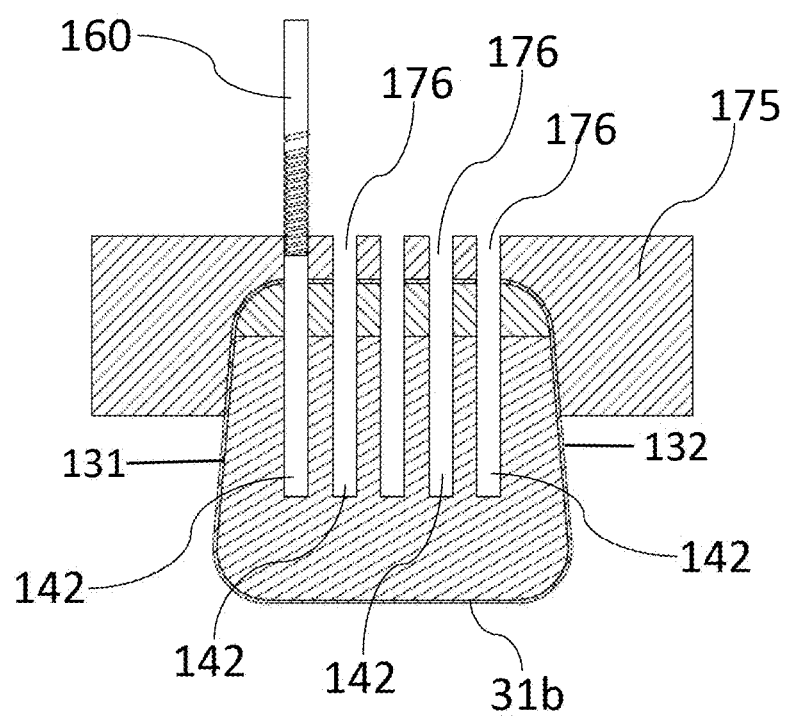

The plurality of elongate slots 142 are similarly machined by a machining tool (such as a router bit 160). FIG. 9 shows a second guide 175 extending over the composite beam 30 and providing a plurality of slots 176 for guiding a machining tool in forming the elongate slots 142.

In this example, the cut out region 141 and elongate slots 142 have a uniform depth along their length. The constant depth of the cut out region 141 and elongate slots 142 makes machining easier as, for example, the router bit 160 can be maintained at a constant depth.

It will be appreciated that in the example shown in FIGS. 5 to 15, the cut out region 141 extends to the structural element 32 and the elongate slots 142 extend through the structural element 32 and into the core 34. However, it will be appreciated that cut out region 141 and structural element 32 may extend any suitable distance into the composite beam 30. In some examples, the elongate slots 142 may extend to the structural element (i.e., they do not extend to the core 34).

The elongate slots 142 each extend across the cut out region 141 (i.e., the damaged area) in the longitudinal direction of the composite beam 30, with the elongate slots 142 extending into the composite beam 30 to a depth greater than a depth of the cut out region 141. Providing elongate slots 142 that are deeper than the cut out region 141 ensures that the minimum amount of material can be removed to form the cut out region 141, whilst ensuring that a large size of the elongate slots 142 is provided. The large size of the elongate slots 142 allows large loads to be transferred across the repair region. The large size of the elongate slots 142 may also provide a correspondingly large bonding surface between the surface of the elongate slots 142 and the reinforcing inserts 152 for transferring loads therebetween, although it will be appreciated that the core 34 does not carry much load in comparison to the structural element 32 and therefore load transfer between the core 34 and the reinforcing inserts 152 is small compared to load transfer between the structural element 32 and the reinforcing inserts 152.

Figure 8:
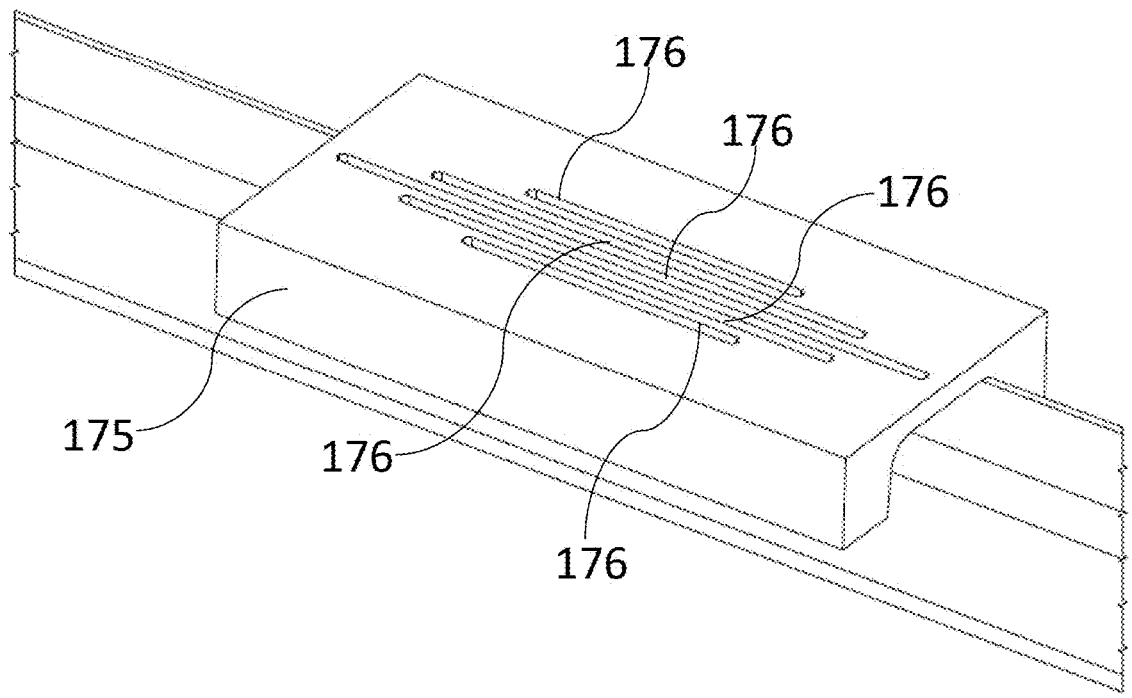
FIGS. 8 and 9 show a guide for guiding a machining tool to form an elongate slot.

In the example shown in FIGS. 8 and 9, five elongate slots 142 are formed, although it will be appreciated that any number of elongate slots 142 may be formed. The elongate slots 142 may be substantially equally spaced from one another in the transverse direction of the composite beam 30 (i.e., perpendicular to the longitudinal direction of the composite beam 30), for example as shown in FIG. 9, with each elongate slot 142 extending substantially equidistantly either side of the cut out region 141 in the longitudinal direction of the composite beam 30.

It will be appreciated that the dimensions of the elongate slots 142 (e.g., the length, depth and thickness) may be tailored to the expected load distribution through the repaired composite beam 130. For example, the longest elongate slots may be positioned where the load is largest. Similarly, it will be appreciated that the positioning of the elongate slots 142 (e.g., the spacing between the elongate slots 142) may be tailored to the expected load distribution.

Figure 10:
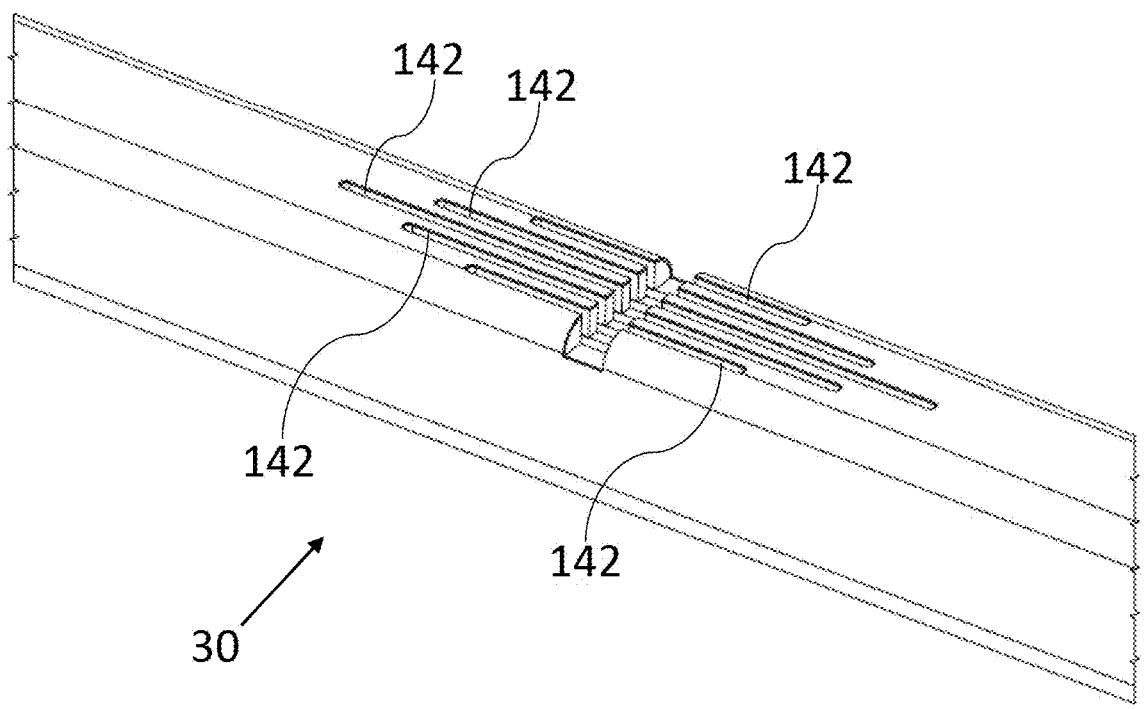
FIG. 10 shows the composite beam comprising a cut out region and a plurality of elongate slots.

In the example shown in FIG. 10, the middle elongate slot 142 is longer than the outer elongate slots 142, with the outermost elongate slot 142 being the shortest, such that each elongate slot 142 get successively longer towards the centre of the composite beam 30. However, in alternative examples, the elongate slots 142 may have the same length.

For ease of manufacturing, each elongate slot 142 may extend perpendicularly into the surface of the composite beam 30, such that the longitudinal sides of the elongate slot 142 are parallel. With this arrangement, the reinforcing inserts 152 may be planar and thereby easier to manufacture (e.g., from a flat sheet of material or similar).

To increase the surface area of the elongate slots 142 in the longitudinal direction, and thereby increase the contact area with the reinforcing inserts 152 in the longitudinal direction, the elongate slots 142 may have a large length-to-thickness aspect ratio. In the example shown in FIG. 11, the length-to-thickness aspect ratio is at least 30:1 (the length to thickness aspect ratio varies between 30:1 for the outer elongate slots 142 and 80:1 for the middle elongate slot 142), as demonstrated by the corresponding dimensions of the reinforcing inserts 152. In alternative examples, the length-to-thickness aspect ratio may be at least 10:1, or at least 50:1. It will be appreciated that the reinforcing inserts 152 have corresponding dimensions.

Similarly, the width-to-thickness aspect ratio may be at least 5:1, at least 10:1, or at least 20:1.

The length of the reinforcing inserts 152 may extend a significant distance beyond the cut out region. For example, the ratio of the length of each reinforcing insert 152 to the length of the cut out region 141 in the longitudinal direction of the composite beam 30 may be at least 5:1, and is preferably at least 10:1. In the example shown in FIGS. 5 to 15, the ratio is at least 8:1.

The reinforcing inserts 152 are spaced from one another by a slot spacing, with a minimum distance defined between each of the reinforcing inserts 152. In the example shown in FIGS. 5 to 15, the ratio is approximately 1:1. In alternative examples, the ratio of the slot spacing to the thickness of the reinforcing inserts is at least 1:1, and is preferably at least 2:1.

In the present examples, the length direction of the elongate slots 142 and reinforcing inserts 152 corresponds to the longitudinal direction of the beam, the thickness direction corresponds to the direction between the first and second surfaces 31a, 31b, and the width direction is orthogonal to the length and thickness directions.

Figure 12:
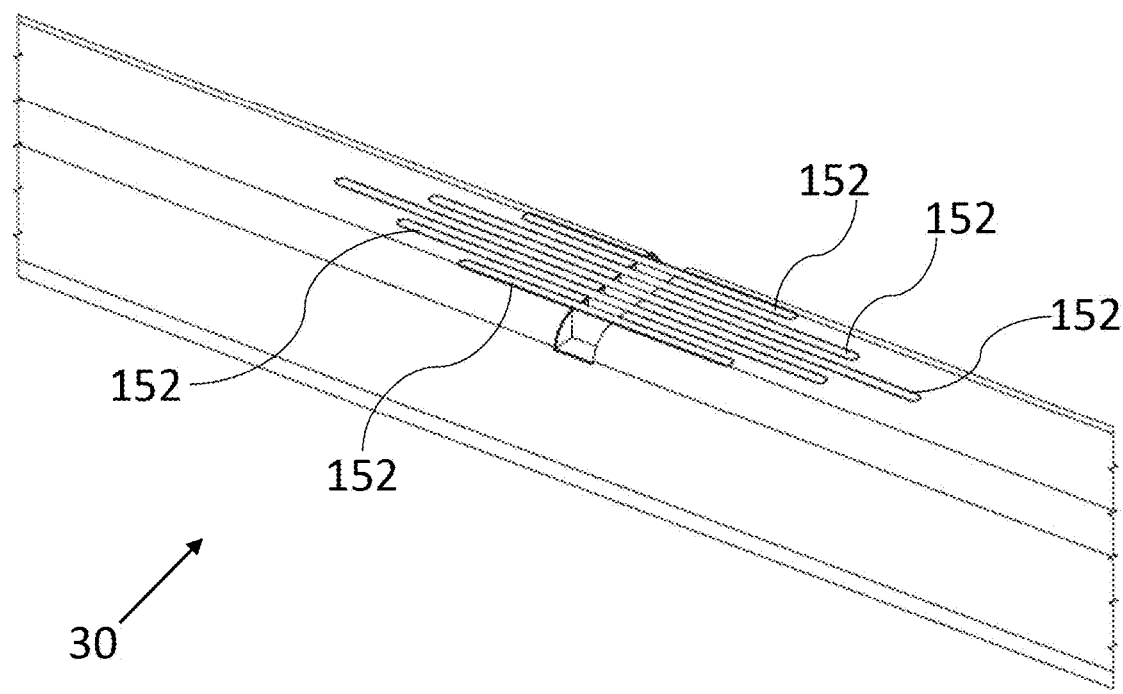
FIG. 12 shows the plurality of reinforcing inserts inserted into the composite beam.

As shown in FIG. 12, the plurality of reinforcing inserts 152 are then inserted into the respective elongate slots 142. To ensure loads are transferred across the reinforcing inserts 152, the reinforcing inserts 152 are fixed into the elongate slots 142 with an adhesive.

Figure 11:
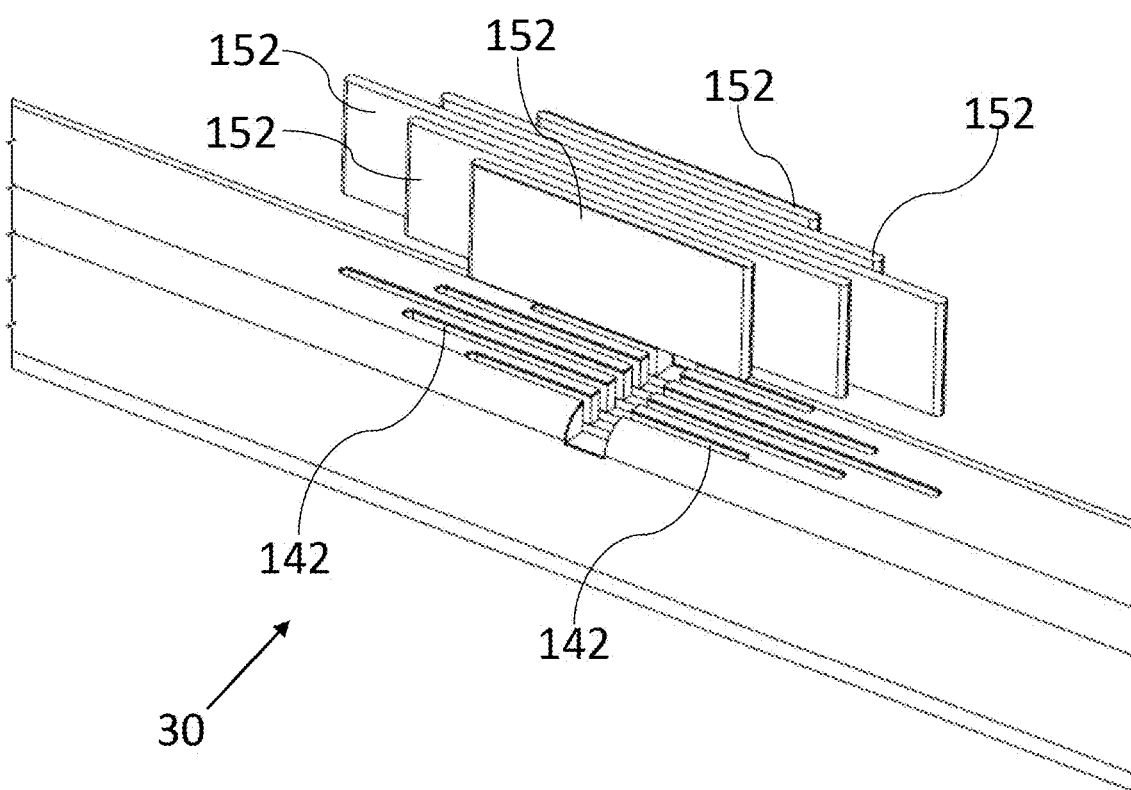
FIG. 11 shows the plurality of reinforcing inserts for inserting into the composite beam.

The reinforcing inserts 152 may each be formed of any suitable material, although in the example shown in FIGS. 11 and 12 the reinforcing inserts 152 are formed of a fibre reinforced composite material. The fibres of the fibre reinforced composite material may be oriented in the longitudinal direction of the reinforcing inserts 152 (or at least a majority of the fibres) such that, when the reinforcing inserts 152 are inserted into the elongate slots 142, the fibres are oriented in the longitudinal direction of the composite beam 30.

Figure 13:
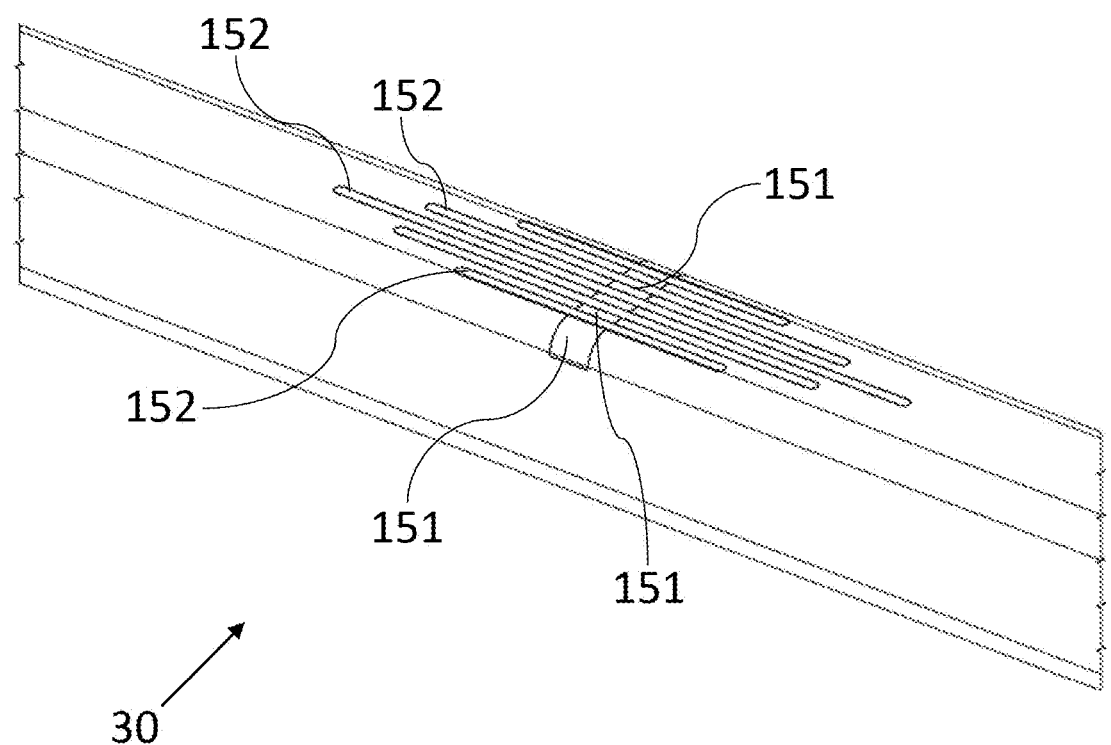
FIG. 13 shows a plurality of filler pieces inserted into the cut out region.

One or more filler pieces 151 may then inserted into the cut out region 141. As shown in FIG. 13, a plurality of discrete filler pieces 151 may be provided that are inserted between the reinforcing inserts 152. Alternatively, a single filler piece 151 may extend across the cut out region 141.

Figure 14:
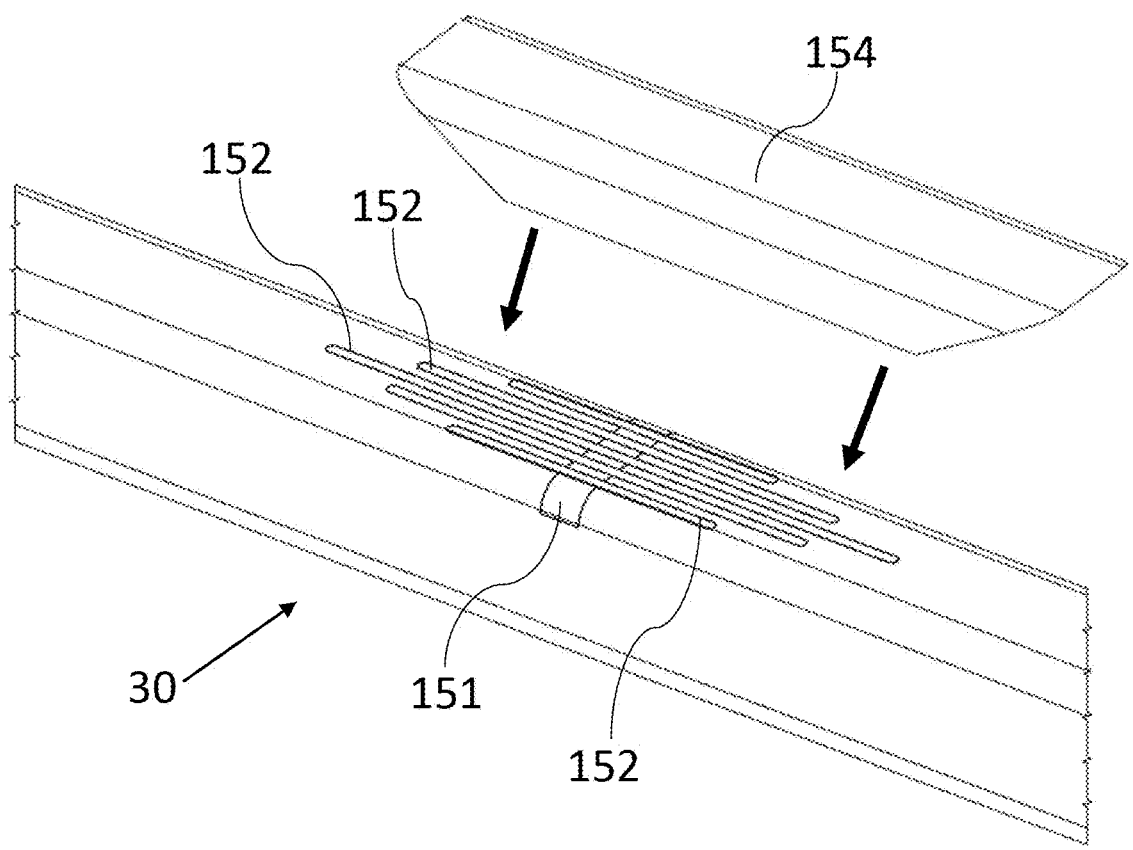
FIG. 14 shows overlapping plies for placing over the cut out region and elongate slots.
Figure 15:
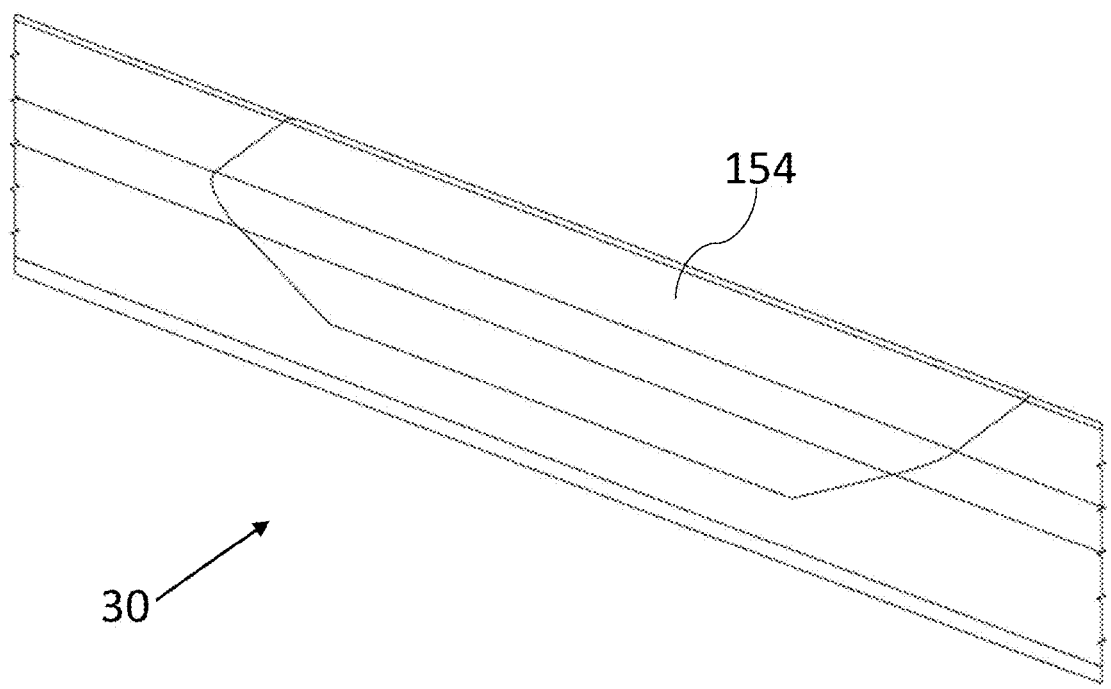
FIG. 15 shows the overlapping plies placed over the cut out region and elongate slots.

As shown in FIG. 14, the overlapping plies 154 are then laid onto the composite beam 30. The overlapping plies 154 may extend over and cover the cut out region 141, filler pieces 151, elongate slots 142 and reinforcing inserts 152, such that the cut out region 141 and the plurality of elongate slots 142 are entirely beneath the overlapping plies 154, for example as shown in FIG. 15.

The composite beam 30 may then be inserted into an oven, autoclave, or other means of curing an uncured adhesive or composite resin of the composite beam 30. For example, the adhesive fixing the reinforcing inserts 152 into the elongate slots 142 may be cured. The overlapping plies 154 may also comprise uncured fibre reinforced composite material. Typically, the reinforcing inserts 152 are cured, rigid, components at the point they are inserted into the elongate slots 142, although in some examples the reinforcing inserts 152 may also comprise uncured material. Upon curing, a repaired composite beam 130 is formed.

It will be clear to the skilled person that the above described examples may be adjusted in various ways.

Figure 16:
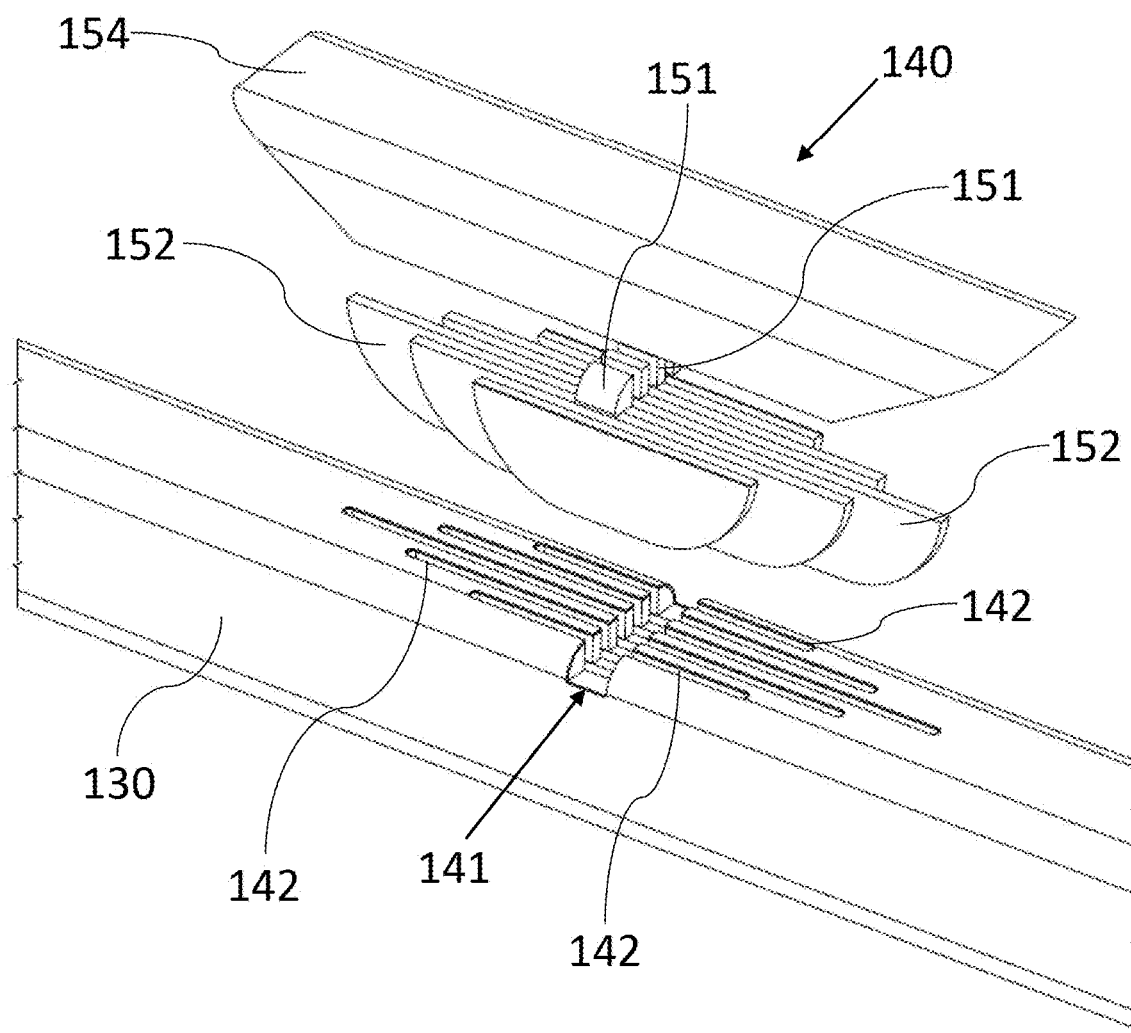
FIG. 16 shows an alternative example of the repaired composite beam in which the reinforcing inserts have a curved portion at each end in the longitudinal direction.
Figure 17:
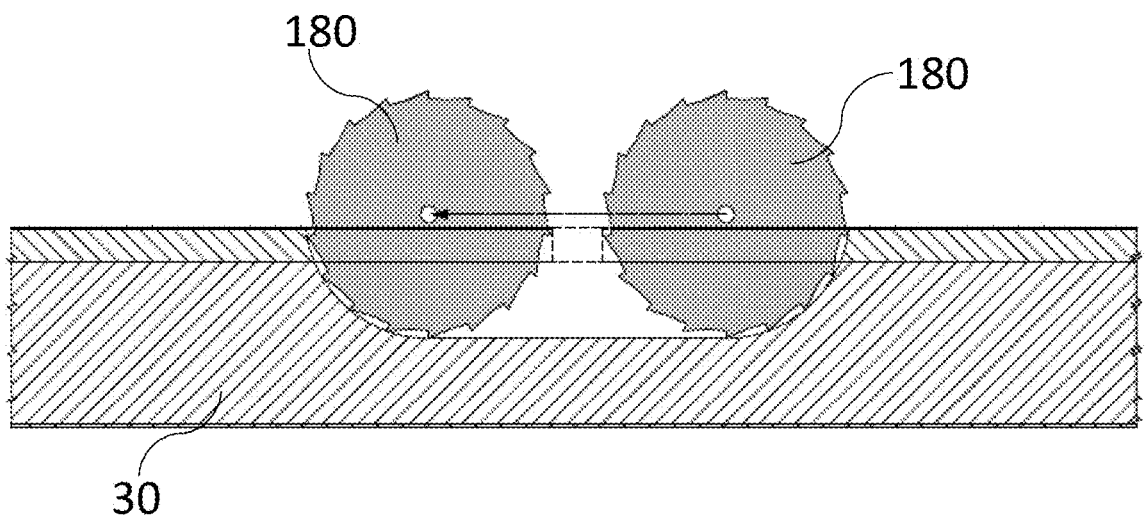
FIG. 17 shows the formation of the elongate slots of the example of FIG. 16.

It will be appreciated that the elongate slots 142 and reinforcing inserts 152 may have any suitable shape. The elongate slots 142 and reinforcing inserts 152 in FIG. 5 are substantially rectangular, although it will be appreciated that they may have any suitable shape. FIG. 16 shows an example in which each elongate slot 142 has a variable depth. In particular, the elongate slot 142 has a maximum depth towards a centre of the elongate slot 142, with a depth that reduces in the longitudinal direction of the composite beam 30. Such an elongate slot 142 in the composite beam 30 may be formed by a circular saw 180 or other means, as shown in FIG. 17. In some examples, the reinforcing inserts 152 may be rods or tubes, or may be wedge shaped such that (e.g.) they have a larger thickness adjacent the first surface 31a than at the opposing end of the reinforcing insert 152.

In the above examples, the composite beam 30 comprises a structural element 32 in which a high proportion of the composite fibres are oriented substantially in the longitudinal direction of the composite beam 30, although it will be appreciated that the fibres may be oriented in any suitable direction, such as orthotropically. However, the described repair method is particularly applicable to composite beams comprising a high proportion of fibres extending in the longitudinal direction, as high proportions of fibres extending in a single direction can lead to poor quality drilled holes, e.g., including increased burring at the entrance/exit of the hole.

The shell 36 is shown to surround the core 34 and structural element 32, although it will be appreciated that the shell 36 may be any suitable shape. In some examples, the shell 36 may not surround the core 34 and structural element 32. For instance, the shell 36 may be substantially U-shaped or omega shaped.

In the examples shown, the composite beam 30 is a linear composite beam. However, it will be appreciated that the composite beam 30 may be curved.

It will be appreciated that any in of the examples described, the composite beam 30 may not comprise a core 34 and/or a shell 36. The reinforcing inserts 152 may not be flush with the first surface 31, and instead may extend out from the first surface 31a.

In some examples in which the damage area is particularly large (e.g., larger than 500 mm), a replacement section of the composite beam 30 may be provided along at least a portion of the existing composite beam 30. The replacement section of the beam 30 may be substantially the same as the existing composite beam 30. In such examples, a cut out region 141 may be defined on either side of the replacement section of the composite beam 30 with separate sets of elongate slots 142 spanning across each of the cut out regions 141.

Where the word 'or' appears, this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A method of repairing a composite beam having a longitudinal direction, the method comprising:
   removing material from a damaged area of the composite beam to form a cut-out region;
   machining a plurality of elongate slots into the composite beam, the elongate slots each having a length in the longitudinal direction of the composite beam and spanning across the damaged area, the elongate slots extending into the composite beam through the cut-out region and the damaged area, and to a depth greater than a depth of the damaged area and the cut-out region; and
   introducing a plurality of reinforcing inserts into the respective elongate slots and fixing the reinforcing inserts into the slots with adhesive.

2. The method of claim 1, where in the step of machining includes machining three or more of the elongate slots and the step of introducing includes introducing three or more of the reinforcing inserts.

3. The method of claim 1, wherein the elongate slots are substantially equally spaced from one another in a transverse direction perpendicular to the longitudinal direction.

4. The method of claim 1, wherein each of the elongate slots extends substantially equidistantly either side of the cut-out region in the longitudinal direction.

5. The method of claim 1, wherein the reinforcing inserts have a thickness and each of the reinforcing inserts is spaced from an adjacent one of the reinforcing inserts by a slot spacing, wherein a ratio of the slot spacing to the thickness is at least 1:1.

6. The method of claim 1, wherein each of the elongate slots is uniform along its length.

7. The method of claim 1, wherein the elongate slots extend perpendicular into a surface of the composite beam.

8. The method of claim 1, wherein the composite beam comprises a fiber reinforced composite element through which the elongate slots extend.

9. The method of claim 8, wherein at least 25% of the composite fibers of the fiber reinforced composite element are oriented substantially in the longitudinal direction of the beam.

10. The method of claim 1, comprising inserting one or more filler pieces into the cut-out region to complete a profile of the composite beam.

11. The method of claim 10, further comprising, subsequent to the introduction of the plurality of reinforcing inserts into the respective elongate slots and the insertion of the one or more filler pieces into the cut-out region to complete the profile of the composite beam, laying one or more overlapping plies onto the composite beam to extend over and cover the one or more filler pieces and the reinforcing inserts.

12. The method of claim 11, wherein the one or more overlapping plies comprise composite fibers oriented at substantially 45 degrees to the longitudinal direction of the beam.

13. The method of claim 12, wherein more than 50% of the composite fibers of the overlapping plies are oriented at substantially 45 degrees to the longitudinal direction of the beam.

14. The method of claim 11, comprising, after laying the one or more overlapping plies onto the composite beam, curing the overlapping plies.

15. The method of claim 1, wherein the composite beam includes a first side, a second side and an edge between the first side and the second side, and the step of machining of the plurality of elongate slots includes machining the elongate slots into the edge of the beam.

16. The method of claim 15, wherein the step of machining the plurality of elongate slots further includes machining a first elongate slot of the plurality of elongate slots into a center region of the edge and machining a second elongate slot of the plurality of elongate slots into a region of the edge between the first side and the center region, wherein the first elongate slot is longer than the second elongate slot.

17. The method of claim 16, wherein the step of machining the polarity of elongate slots further includes machining a third elongate slot of the plurality of elongate slots in a region of the edge between the center region and the second side, and the third elongate slot has a length substantially the same as the length of the second elongate slot.

18. A method of repairing a composite beam having a longitudinal direction, the method comprising:
removing material from a damaged area of the composite beam to form a cut-out region;
machining a plurality of elongate slots into the composite beam, the elongate slots each having a length in the longitudinal direction of the composite beam and spanning across the damaged area, the elongate slots extending into the composite beam to a depth greater than a depth of the cut-out region; and
introducing a plurality of reinforcing inserts into the respective elongate slots and fixing the reinforcing inserts into the slots with adhesive,
wherein a ratio of a length of each of the reinforcing inserts in the longitudinal direction to a length of the cut-out region in the longitudinal direction is at least 5:1.

\* \* \* \* \*